United States Patent [19]

Webster et al.

[11] 4,444,493

[45] Apr. 24, 1984

[54] PLATEN COVER FOR A COPIER HAVING A DOCUMENT RETAINING POCKET

[75] Inventors: Gary L. Webster, Fairfield; Eugene P. Lavin, Stratford, both of Conn.

[73] Assignee: Pitney Bowes Inc., Stamford, Conn.

[21] Appl. No.: 364,333

[22] Filed: Apr. 1, 1982

[51] Int. Cl.³ .............................................. G03B 27/62
[52] U.S. Cl. ................................................. 355/75
[58] Field of Search .................................. 355/75, 132

[56] References Cited

U.S. PATENT DOCUMENTS 4,053,223 10/1977 Nebiker et al. .................... 355/75
4,097,147 6/1978 Portewig ........................ 355/75 X

*Primary Examiner*—Richard A. Wintercorn
*Attorney, Agent, or Firm*—Martin D. Wittstein; William D. Soltow, Jr.; Albert W. Scribner

[57] ABSTRACT

An external, reciprocating platen carriage mounted upon an electrophotographic copying machine has a document cover pivotally mounted on the rear elongated portion of the carriage assembly. The document cover has a retaining pocket which extends substantially along a major portion of its longest mounting side, and laterally a relatively short portion of its width. The pocket includes ends which prevent documents which are placed upon the uppermost surface of the cover from sliding off the cover due to abrupt terminal motion of the platen carriage.

4 Claims, 7 Drawing Figures

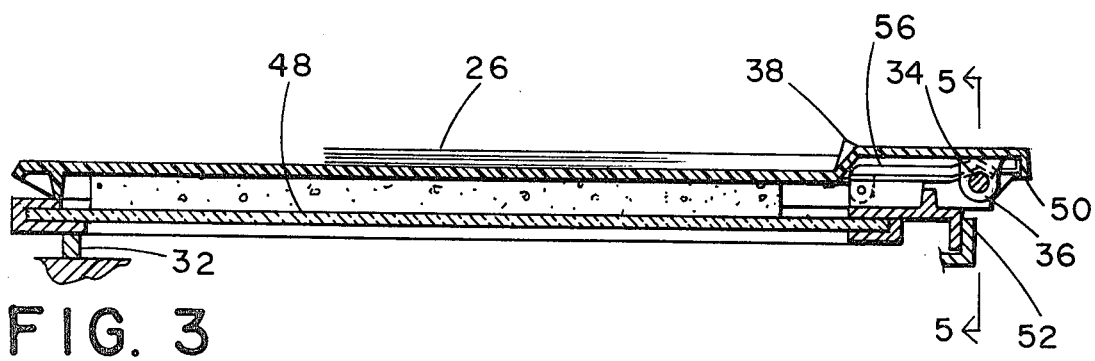
FIG. 3
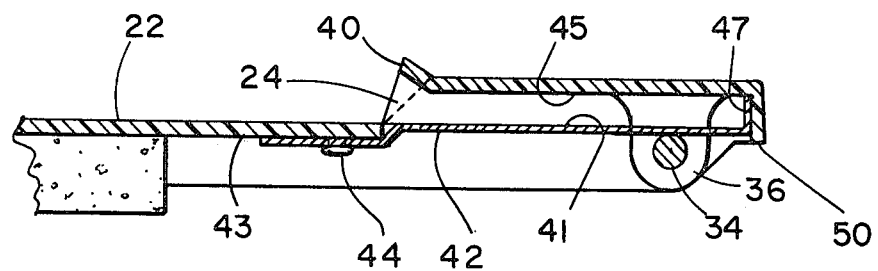
FIG. 6
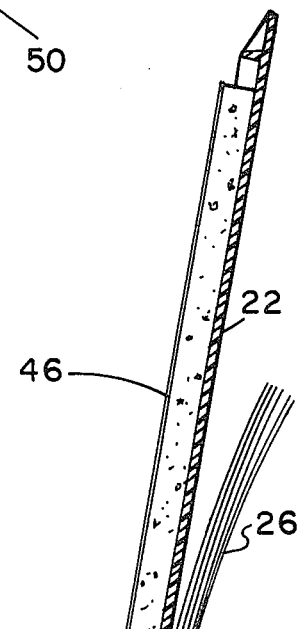
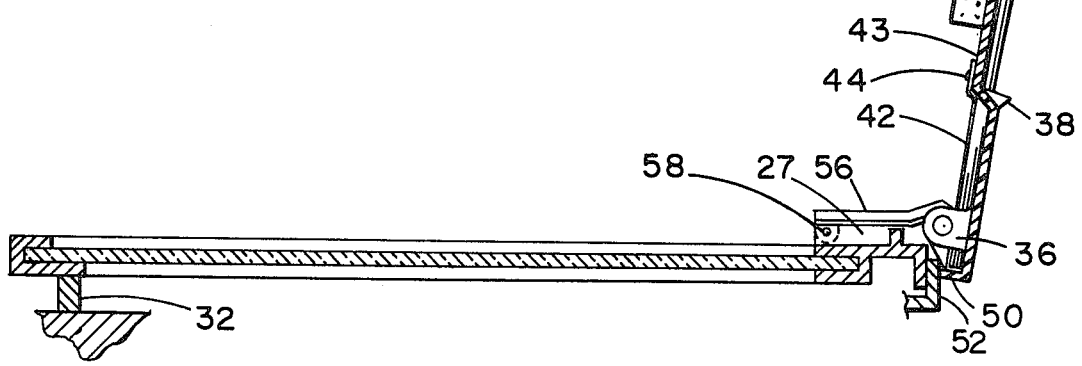
FIG. 4

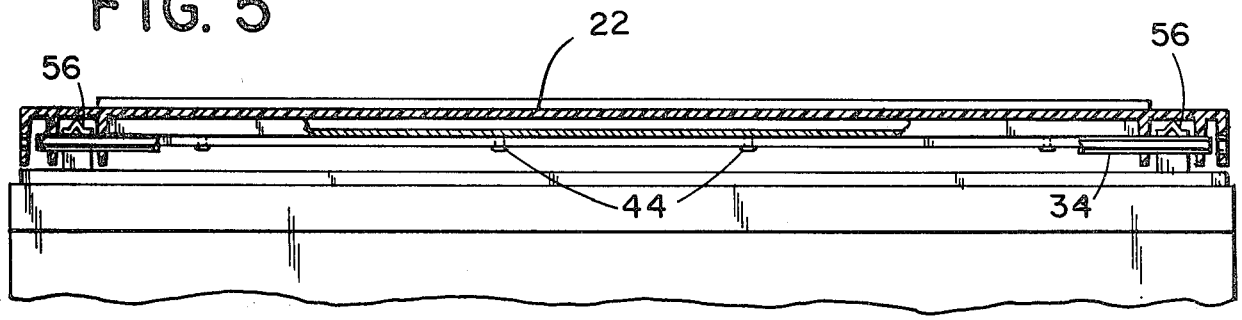
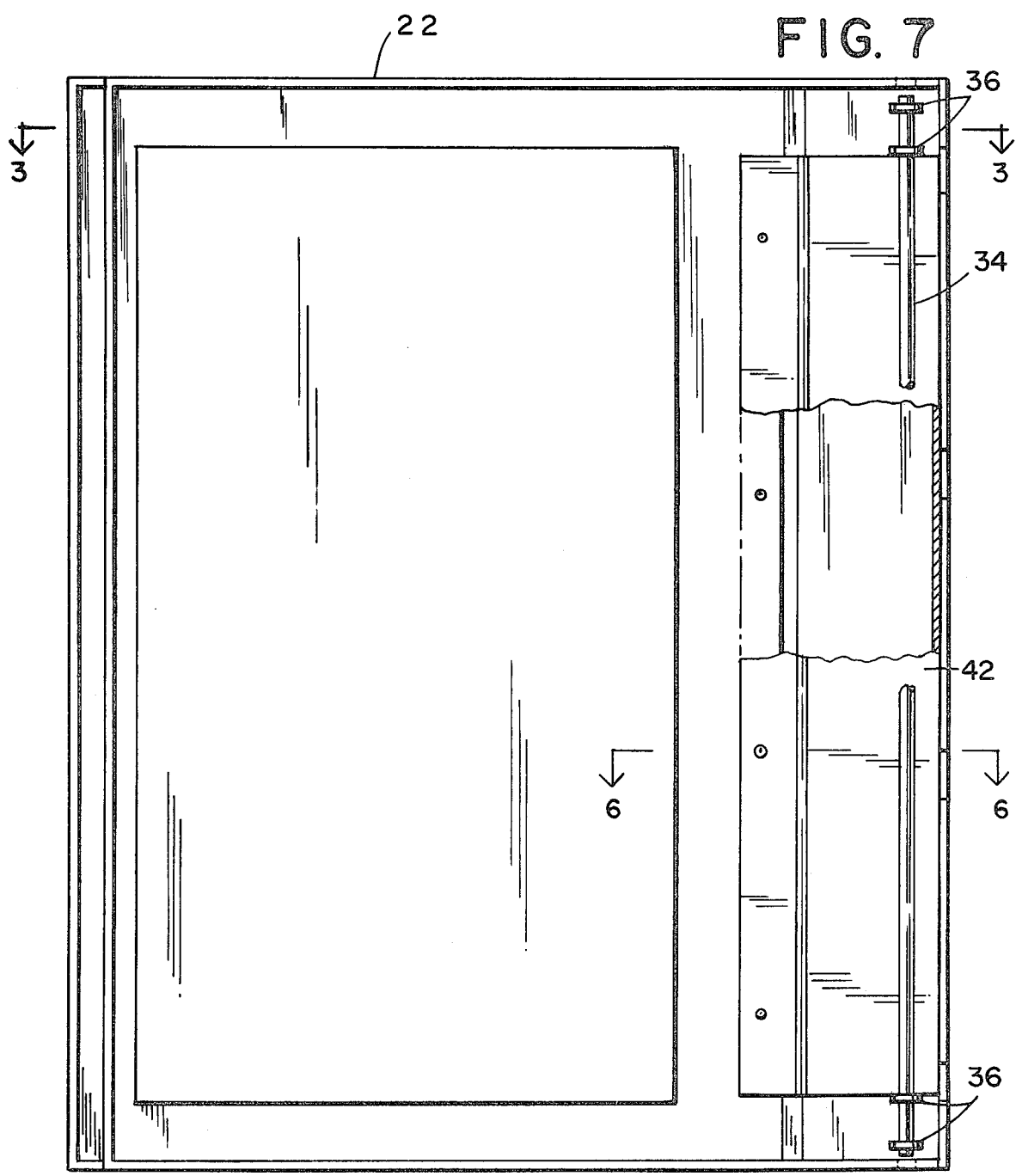

PLATEN COVER FOR A COPIER HAVING A DOCUMENT RETAINING POCKET

BACKGROUND OF THE INVENTION

1. Field of the Invention

The present invention relates to a document cover used to cover original documents placed upon the glass platen over the document illumination station which is part of an electrophotographic copying machine having an external reciprocating carriage assembly. In particular, this invention relates to a document cover for handling and storing a stack of documents which are being manually handled while the copier is at rest or operating.

The prior art through the years shows that different types of document covers have been developed and marketed for copying machines having transparent original document holding platens.

The early document covers were simply flexible, rubber mats, connected to the housing or moving carriage assembly of the copying machine, adjacent to one edge of the transparent platen. The flexible rubber document cover typically has a white undersurface to reflect light passing beyond the borders of the document being copied. Usually, these document covers are fastened at the short edge of the document glass platen, and are manually raised by means of an attached hand grip at the opposing short side of the cover.

Later document covers are hinged at the longer side of the cover, rearwardly located with respect to the operator. These covers are typically rigid, with various forms of construction including foam plastic, with combined strengthening ribs and bends which help to increase rigidity.

Both early and later variations of document covers described are used for copiers having either stationary or reciprocating original document holding platens.

The basic function of the document cover is to clamp an original document firmly to the top of the platen glass in the copier. Whether the glass is stationary or fixed, the covers accomplish the clamping of an original document, however on the moving external carriage copier machines there remains a problem. The problem being in respect to a stack of document material the operator has to place down while operating the machine, and particularly while utilizing the document cover.

To date, document covers as such do not provide means to prevent the stack of documents an operator is working with from sliding off the moving carriage assembly due to abrupt reciprocating terminal motion of the platen carriage assembly. It is additionally desirable to have a capturing pocket device which prevents the same documents from falling from the document cover when the cover is raised or lowered and the machine is at rest.

2. Prior Art

U.S. Pat. No. 4,053,223 issued to Nebiker and Yanofsky discloses a combined document cover and document storage assembly for a copying machine which copies both flat sheets and thick book documents that are placed on a fixed, non-moving platen glass. The cover has a U-shaped pocket for the purpose of holding documents with the enclosing portion of the U located on the rear edge. This cover achieves the purpose of holding a stack of documents placed on the cover for the purpose of retaining them when the cover is upwardly lifted or lowered by an operator.

This patent teaches how to prevent a document or stack of documents from falling from a liftable document cover. However, it does not teach how to prevent documents from falling from a document cover which is mounted upon a platen carriage assembly having reciprocating motion which is abruptly terminated.

SUMMARY OF THE INVENTION

A document cover for a copying machine mounted on a platen reciprocates between, and stops at two terminal positions during operation of the copier in order to scan an original document by the optical mechanism. The document cover has a hinge arrangement to permit raising and lowering with respect to the platen, and also has a document retaining receptacle formed along the longitudinal edge adjacent to the hinge. The retaining receptacle holds documents in place while the cover is being raised and lowered. The retaining receptacle is comprised of an enclosed pocket extending along a major portion of the length of the document cover, and extending laterally along a relatively short portion of its width. Therefore, documents resting on the upper surface of the cover are maintained in position, and cannot slide off of this surface when the platen stops abruptly at the terminal positions.

It is an object of the present invention to provide a means of receiving and holding a stack of original documents on the upper surface of the document cover combined with the external reciprocating carriage which translates, through abrupt terminal motion on a copier.

It is another object of the present invention to provide a means of retaining documents when the platen cover is raised or lowered to or from an overcenter upright position while the platen carriage assembly is stopped.

Therefore, the present invention is comprised of an improvement which solves the problems heretofore defined with respect to copiers having external reciprocating carriage assemblies having document covers. The improvement consists of a document retaining pocket which prevents a document or stack of documents from sliding off the cover due to abrupt terminal motion or manual raising or lowering of the cover while the carriage is in a standing position.

It is a further object to provide means to guide documents into the retaining pocket.

BRIEF DESCRIPTION OF THE DRAWINGS

FIG. 3 represents a partial-end sectional view of the copier shown in FIG. 1, with the document cover in the normal copying position.

FIG. 4 represents another partial-end sectional view of the copier shown in FIG. 1, with the document cover in the upright position.

FIG. 5 illustrates a partial rear sectional view, to show the details of the document cover in the normal copying position.

FIG. 6 is an enlarged detailed end sectional view taken from FIG. 3 in order to show details of the sheet holding document pocket.

FIG. 7 is a bottom view of the document cover.

DETAILED DESCRIPTION OF THE INVENTION

Figure 1:
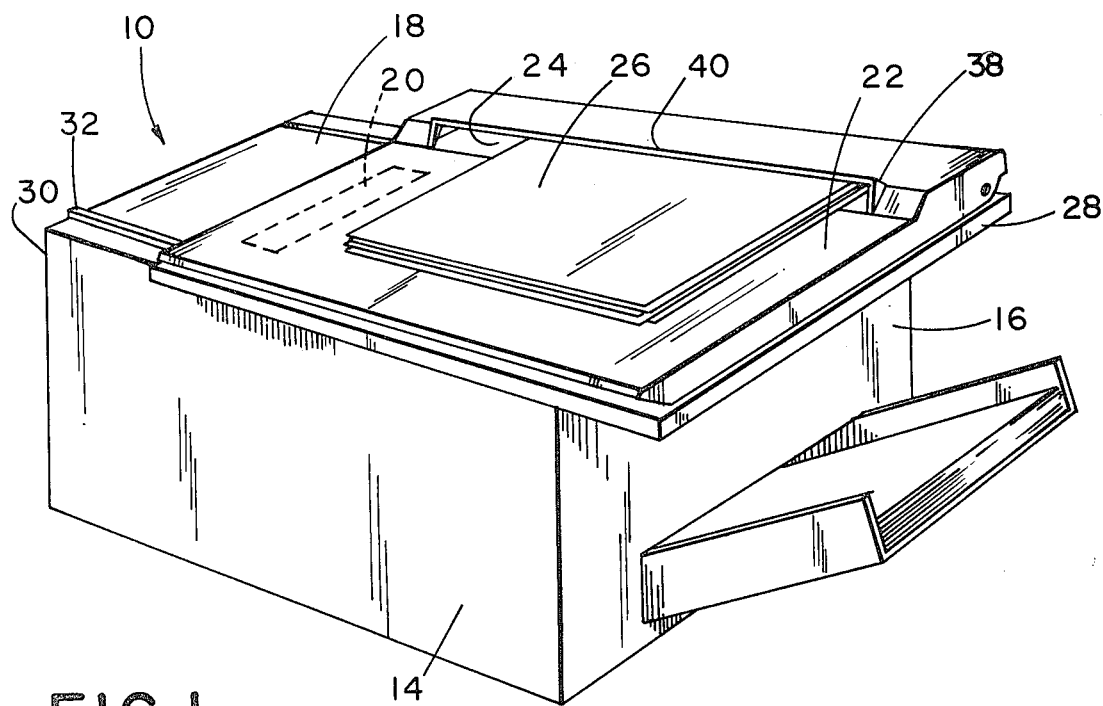
FIG. 1 represents an isometric view of a typical external reciprocating carriage style electrophotographic copying machine with an operator liftable document cover having a stack of documents on its upper surface, and retained by the invention.
Figure 2:
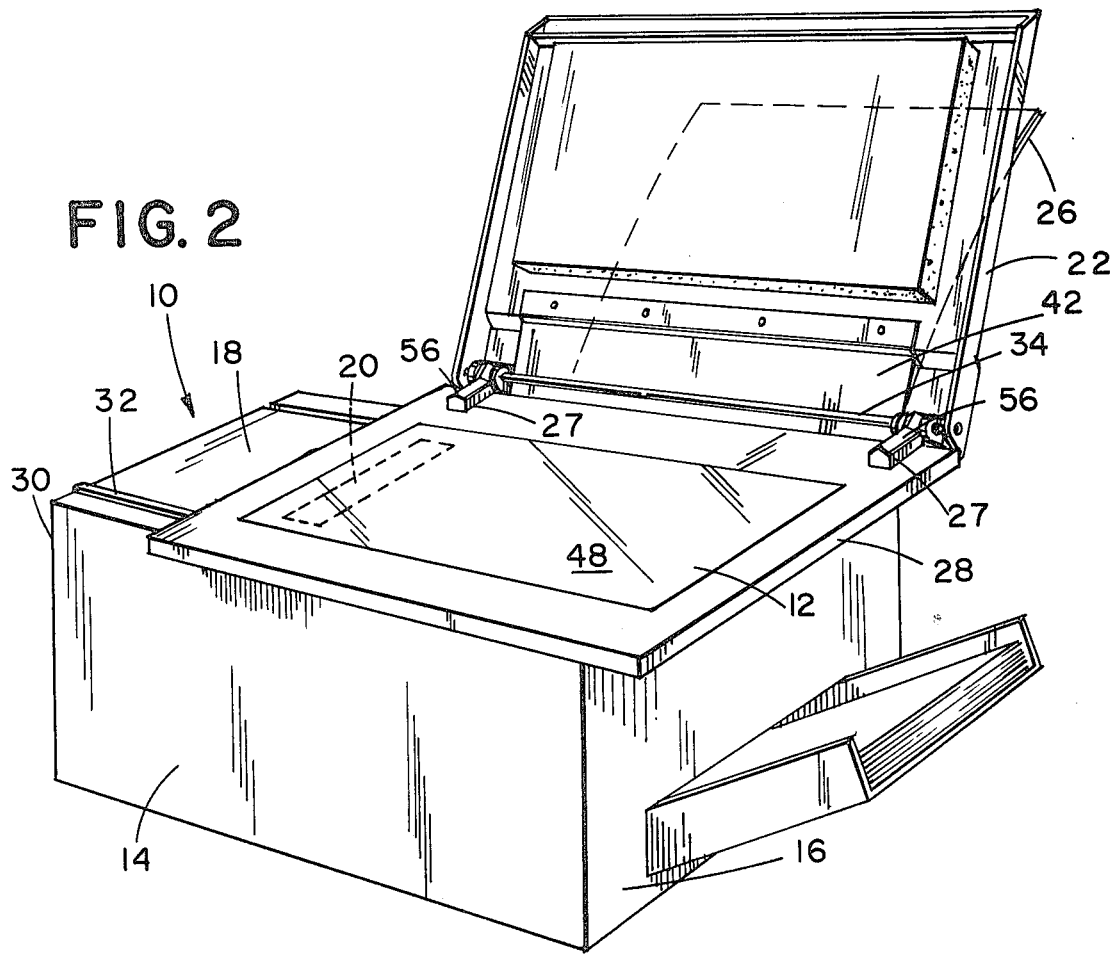
FIG. 2 represents another isometric view, similar to FIG. 1, showing the document cover in an open position, with the stack of documents appropriately retained by the invention.

Referring to FIGS. 1 and 2 of the drawings, the reference numeral 10 indicates generally an electrophotographic copying machine having a reciprocating platen carriage with a platen glass 12 for holding the original document to be copied. Since the copying machine 10 is of a widely distributed and well known type, the drawings particularly illustrate the principles and features of the present invention only. The copier 10 has a front cover 14 and a right hand side cover 16. The copier 10 additionally has an upper housing cover 18, which has an appropriate optical slot 20 for the purposes of transmitting an image of a document to be copied (not shown).

Details which disclose the present invention include that portion of a document cover 22, including the document retaining, enclosed pocket 24, shown holding a stack of documents 26 in two alternate positions (FIGS. 1 & 2). The document cover 22 is constructed to be substantially rigid, and capable of remaining in an over center, upright position as shown in FIG. 2. There are articulating hinge members 27 suitably connected to the platen carriage assembly 28 by appropriate hardware not shown. The hinges 27 allow the cover 22 to assume at least the two positions illustrated in FIGS. 1 and 2 in addition to accomodating thick document material such as a book.

The copier 10 is of the external, reciprocating carriage type, which means that the document platen carriage assembly 28 including the document cover 22 is caused to reciprocate between two end terminal positions with respect to the end copier housing covers 16 and 30. During the reciprocating motion, the carriage assembly 28 will traverse over the optical slot 20 located within the upper housing cover 18. The carriage assembly 28 is caused to move initially in one direction, for a distance generally exceeding the maximum length of document to be copied. This motion is typically provided through connections made by appropriate platen carriage assembly drive apparatus (not shown), such as that described within U.S. Pat No. 3,697,165, issued to Morrison and Calvi. After completing the first half of travel, the carriage assembly 28 then moves in a reversing direction, and returns the assembly 28 to the original starting point where another cycle may begin if the copier operator has required more than one copy of a given document.

The carriage assembly 28 is suitably, slidably supported by a drawer slide (not shown) and an upright rail 32, included within the structure of the upper housing cover 18. The connecting means including the drive means described within the aforementioned U.S. Pat. No. 3,697,165 provides the necessary attachment for keeping the carriage assembly on the support rail 32 as well as providing the necessary reciprocating motion to the carriage assembly 28.

Referring to FIG. 2, there is a hinge shaft 34 which provides the necessary hinge-and-pivot connection for the upper lid document cover 22 with respect to the remainder of the platen carriage assembly 28. The hinge shaft 34 simultaneously engages the dual set of articulating hinges 27 and bosses 36 (best seen in FIG. 4), which are integrally part of the upper document cover 22, which, for the purposes of mass production, is suitably injection molded in one piece. The document retaining pocket 24 is partly formed from a juncture of a raised portion 38, which is forwardly and upwardly flared to form a lip 40 which helps to guide the approaches of documents manually aimed at the pocket 24. Referring to FIG. 6, a separate member 42, which is metal or plastic is appropriately attached to the cover 22 to form a bottom wall 41 extending along the rear longitudinal edge of the cover 22.

The attachment is accomplished as shown in FIG. 6 through a sonic weldment provided at multiple bosses 44, along the length of the rear portion 43 of document cover 22, so that the retaining pocket 24 is enclosed on two opposing upper and lower walls 45 and 41 respectively. There is a rear upright wall 47 formed at right angles from member 42, in order to provide a rearward restraining stop for the stack of documents 26 placed in the retaining pocket 24. It will also be recognized by those skilled in the art that the bosses 36 of the cover 22 also serve as end to end restraining members which engage the ends of the stack of documents 26 when the platen carriage assembly 28 abruptly terminates its reciprocal motion during operation.

FIG. 4 shows the platen cover 22 in the upright, over center position, and it can easily be seen that the enclosed document retaining pocket 24 holds a stack of documents 26 while the platen cover 22 remains in that position. Other details of the document platen cover 22 include a resilient foam member 46 (FIG. 4), which is utilized to clamp down a given document to the upper surface 48 of the glass platen 12 of the carriage assembly 28. It is also seen in FIG. 4 that the lower, back wall 50 of the upper portion of the platen cover 22 stops against a machine member 52, (which is part of the structure of assembly 28) while the document cover 22 remains in the open position.

If necessary, to provide additional flexibility for the operator of the copier, (FIG. 4) there are spring clamp members 56, which provide a resilient detachment means in order to unhook the upper document cover 22, from the remainder of the carriage assembly 28. For example, the cover 22 is removed at such times that a book is so thick as to be beyond the limit of the capabilities of the articulating hinge members 27. The spring clamp members 56 are suitably attached to the hinge members 27 by pin members 58. There are appropriate connecting holes in the hinge members 27, which align with the holes in the clamp members 56, in order to engage the pins 58. The details of the pin 58 and hole connections are not fully shown within the drawings, or explained in the present specification.

These and other features disclosed within the present specification are henceforth captured within the spirit and scope of the following claims.

What is claimed is:

1. In a document cover for a copying machine having a platen on which documents are placed for copying and which platen reciprocates between, and stops abruptly at, two terminal positions to permit an optical scanning mechanism in the copying machine to scan the document as part of the copying process, the document cover being mounted on the platen for movement therewith by hinge means to permit the document cover to be raised and lowered with respect to the platen, the document cover also having a document retaining means formed thereon along the longitudinal edge thereof adjacent the hinge means for holding documents in place on the upper surface of the document cover while it is being raised and lowered, the improvement comprising: said document retaining means being an enclosed pocket extending along a major portion of the length of said document cover and extending laterally along a relatively short portion of the width of said document cover whereby documents resting on said upper surface of said document cover are maintained in position thereon and cannot slide off of said upper surface when said platen stops abruptly at said terminal positions.

2. The improvement as set forth in claim 1 wherein said pocket is defined by a raised portion of said document cover extending longitudinally and laterally contiguous with said pocket dimensions and constituting an upper wall for said pocket, a member connected to the under side of said document cover and extending longitudinally and laterally contiguous with said pocket dimensions and constituting a lower wall for said pocket, and a pair of relatively short walls connected between said upper wall and said lower wall and constituting side walls for said pocket.

3. The improvement as set forth in claim 2 wherein the juncture raised portion of said document cover and the remaining portion of said document cover defines an elongate opening into said pocket through which documents placed on said cover are inserted.

4. The improvement as set forth in claim 3 wherein said raised portion of said document cover includes a forwardly and upwardly flared (angled) lip extending along the upper edge of said elongate opening to guide the approaching edges of documents into said opening.

* * * * *